United States Patent
Leone et al.

(10) Patent No.: US 7,844,834 B2
(45) Date of Patent: Nov. 30, 2010

(54) METHOD AND SYSTEM FOR PROTECTING DATA, RELATED COMMUNICATION NETWORK AND COMPUTER PROGRAM PRODUCT

(75) Inventors: Manuel Leone, Turin (IT); Ettore Elio Caprella, Turin (IT)

(73) Assignee: Telecom Italia S.p.A., Milan (IT)

( * ) Notice: Subject to any disclaimer, the term of this patent is extended or adjusted under 35 U.S.C. 154(b) by 295 days.

(21) Appl. No.: 10/584,912

(22) PCT Filed: Dec. 30, 2003

(86) PCT No.: PCT/EP03/14956

§ 371 (c)(1), (2), (4) Date: Jun. 29, 2006

(87) PCT Pub. No.: WO2005/064881

PCT Pub. Date: Jul. 14, 2005

(65) Prior Publication Data

US 2007/0055873 A1      Mar. 8, 2007

(51) Int. Cl.
*H04L 29/06* (2006.01)
*G06F 11/30* (2006.01)
*G06F 12/14* (2006.01)
*H04L 9/00* (2006.01)

(52) U.S. Cl. .................. 713/193; 713/155; 380/44; 380/273

(58) Field of Classification Search .......... 713/193, 713/155; 380/44, 273
See application file for complete search history.

(56) References Cited

U.S. PATENT DOCUMENTS

| | | | | |
|---|---|---|---|---|
| 5,495,533 A | * | 2/1996 | Linehan et al. | 713/155 |
| 5,534,857 A | * | 7/1996 | Laing et al. | 340/5.74 |
| 6,504,932 B1 | * | 1/2003 | Vasnier et al. | 380/273 |
| 6,591,364 B1 | * | 7/2003 | Patel | 713/170 |
| 6,690,930 B1 | * | 2/2004 | Dupre | 455/411 |
| 7,120,935 B2 | * | 10/2006 | Serani et al. | 726/27 |
| 7,177,425 B2 | * | 2/2007 | Ben-Chuan et al. | 380/44 |

(Continued)

FOREIGN PATENT DOCUMENTS

WO     WO 98/44402     10/1998

(Continued)

OTHER PUBLICATIONS

GSM Technical Specification GSM 03.20 (ETSI TS 100 929 v8.1.0): "Digital Cellular Telecommunication System (Phase 2+); Security Related Network Functions", European Telecommunication Standards Institute, pp. 1-95, (2001).

(Continued)

*Primary Examiner*—Shin-Hon Chen
(74) *Attorney, Agent, or Firm*—Finnegan, Henderson, Farabow, Garrett & Dunner, L.L.P.

(57) ABSTRACT

A method for securely storing at least one user's private information item, such as a private key for cipher processing, includes the steps of providing a communication network wherein the user is allotted a respective subscriber identity module and the subscriber identity module stores at least one security algorithm; producing a cipher key via the at least one security algorithm; and providing a remote storing location accessible by the user via the communication network wherein the user's private information items are stored as files encrypted via the cipher key.

14 Claims, 5 Drawing Sheets

U.S. PATENT DOCUMENTS

Figure 1:
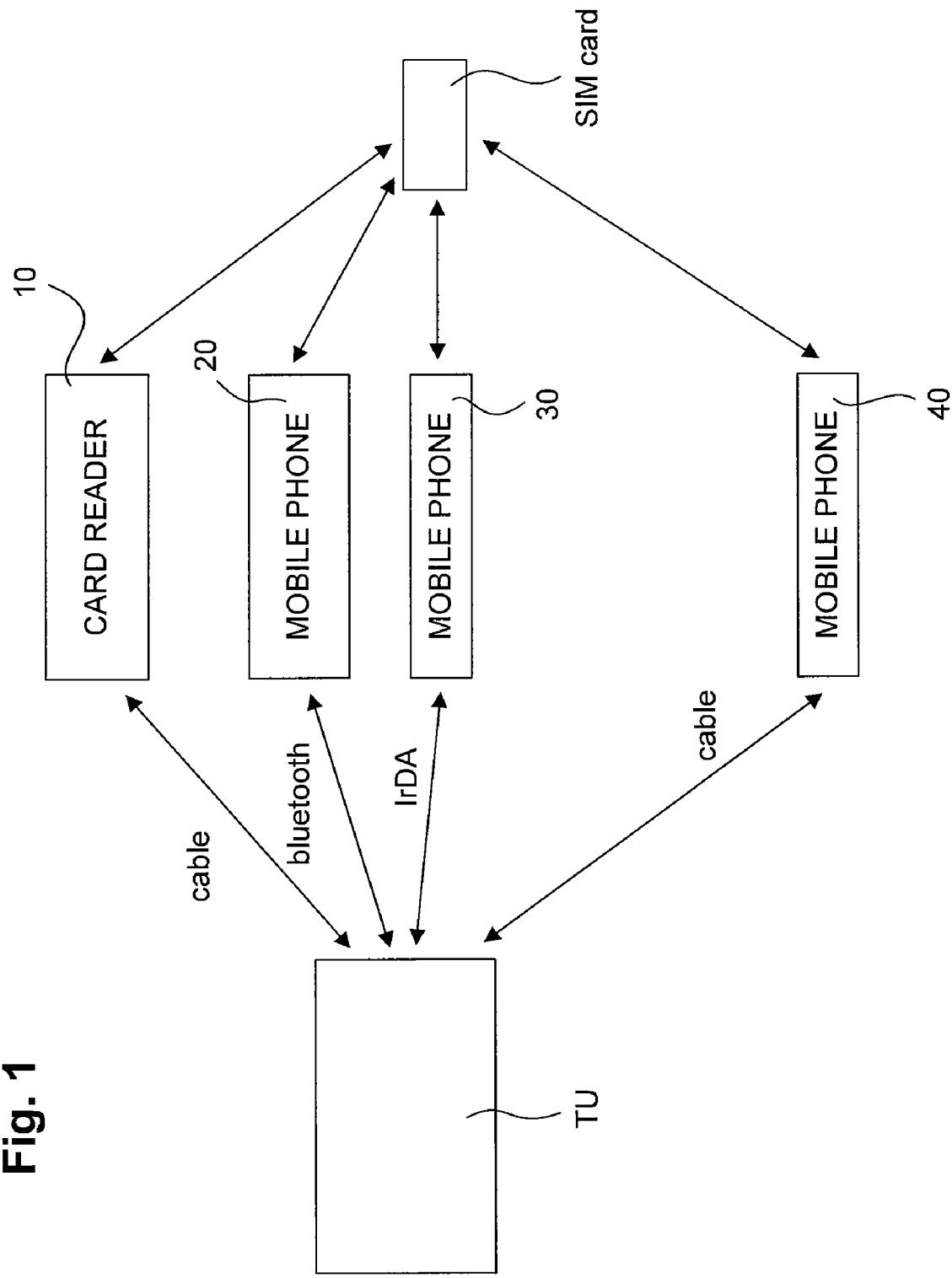

| | | | |
|---|---|---|---|
| 2003/0097341 A1 | 5/2003 | Hans et al. | |
| 2003/0188180 A1* | 10/2003 | Overney | 713/193 |
| 2004/0024846 A1* | 2/2004 | Randall et al. | 709/219 |
| 2004/0204124 A1* | 10/2004 | Campbell | 455/566 |
| 2004/0210766 A1* | 10/2004 | Kroselberg | 713/201 |
| 2005/0021940 A1* | 1/2005 | Ma | 713/155 |
| 2005/0037752 A1* | 2/2005 | Kwan et al. | 455/432.3 |

FOREIGN PATENT DOCUMENTS

| | | |
|---|---|---|
| WO | WO 01/69838 A2 * | 9/2001 |
| WO | WO 02/052784 | 7/2002 |
| WO | WO 02/054210 | 7/2002 |
| WO | WO 03/037016 | 5/2003 |

OTHER PUBLICATIONS

GSM Technical Specification GSM 11.11 (ETSI TS 100 977 v8.3.0); "Digital Cellular Telecommunication System (Phase 2+); Specification of the Subscriber Identity Module—Module Equipment (SIM-ME) Interface", European Telecommunication Standards Institute, pp. 1-170, (2000).

Menezes et al., "Handbook of Applied Cryptography", CRC Press, ISBN: 0-8493-8523-7, pp. 321-383, (1996).

* cited by examiner

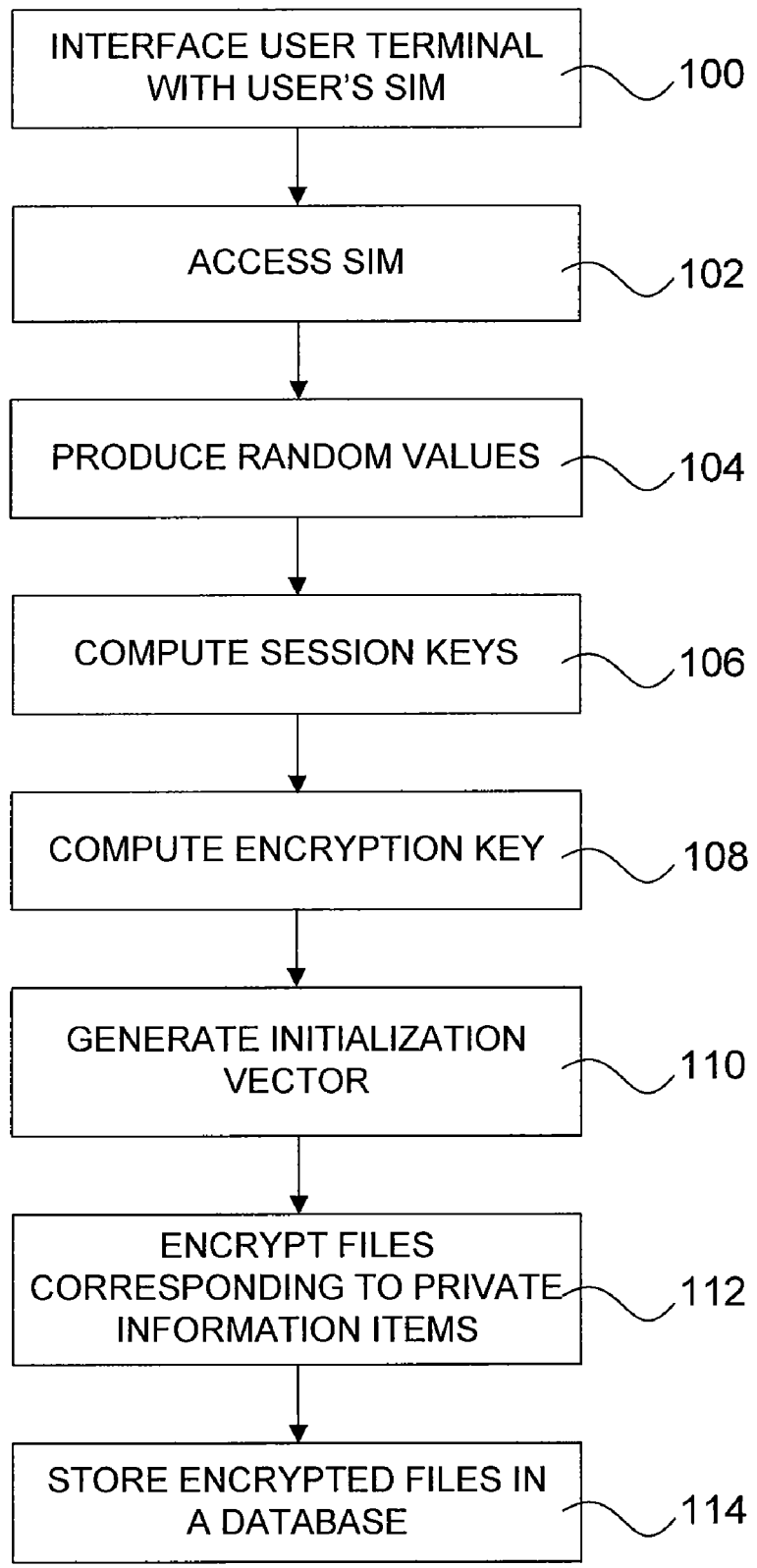

Fig_3
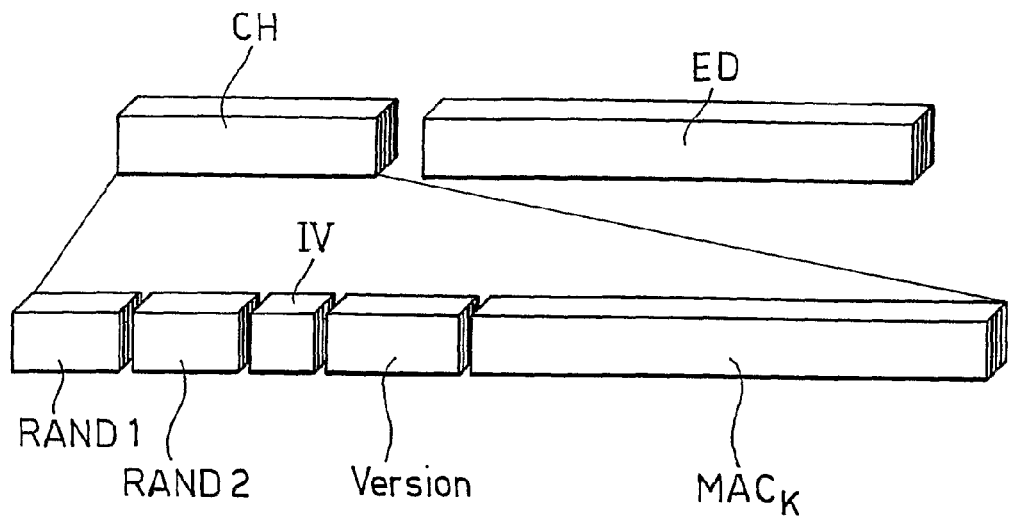
Fig_4
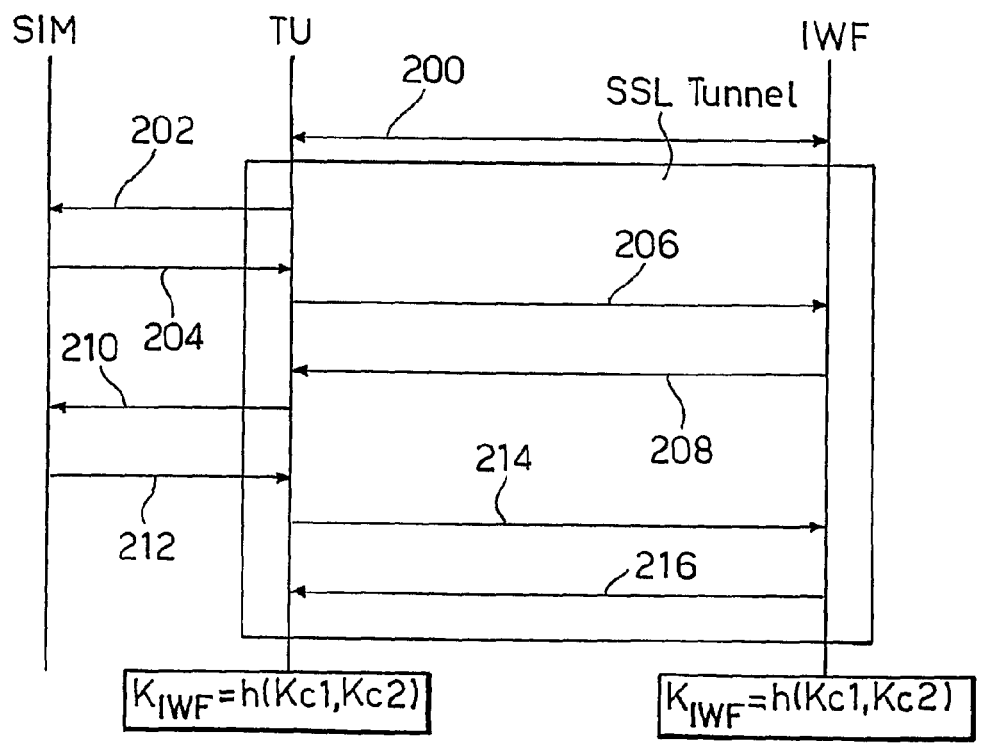

METHOD AND SYSTEM FOR PROTECTING DATA, RELATED COMMUNICATION NETWORK AND COMPUTER PROGRAM PRODUCT

CROSS REFERENCE TO RELATED APPLICATION

This application is a national phase application based on PCT/EP2003/014956, filed Dec. 30, 2003, the content of which is incorporated herein by reference.

FIELD OF THE INVENTION

The present invention relates in general to techniques for protecting data.

DESCRIPTION OF THE RELATED ART

Cryptography is considered today as one of the basic tools for implementing security in systems and networks. In that context, specific attention has been and is being paid to public-key cryptographic systems.

A public-key cryptographic system is based on the assumption that only the user knows his or her private key. This condition is strictly necessary, especially in the case of digital signature services. For that purpose, private keys of users are often stored in specific security devices such as smart cards, USB tokens or PCI/PCMCIA cards. These devices have the purpose of storing the keys in tamper proof memories. They also take care of all the cryptographic operations based on such keys, often preventing the keys themselves from being communicated to the outside in order to reduce the risk for compromise.

In WO-A-98/44402 a copyright protection scheme is provided in which data is downloaded from a server, typically over the Internet to a client for presentation to a user. The downloaded data is cryptographically protected, by encryption and hashing. When displayed by the client, storing and copying functions are selectively disabled in respect of the data, in order to prevent unauthorised copying.

US-A-2003/0097341 discloses a method of encrypting data, a telecommunication terminal and an access authorisation card that permit utilisation of services of one or more service providers independently of a network operator or manufacturer of the telecommunication terminal. Encrypted data is transmitted between a service provider and a telecommunication terminal over a telecommunication network. Data to be transmitted over the telecommunication network is encrypted as a function of the service provider selected.

Additionally, WO-A-02/052784 discloses a method of authenticating a client comprising the step of sending a subscriber identity to an authentication server, obtaining at least one challenge and at least one first secret to the authentication server based on a client's secret specific to the client. Further steps include forming first credentials, forming a first authentication key using the at least one first secret, encrypting the first credentials using the first authentication key, sending the at least one challenge and the encrypted first credentials to the client, forming an own version on the first authentication key to the client. The encrypted first credentials are decrypted using the own version of the first authentication key. In such a method, the encrypted credentials are sent together with the at least one challenge to the client so that the client can proceed with authentication only if it can derive the first secret from the at least one challenge.

OBJECT AND SUMMARY OF THE INVENTION

The object of the invention is thus to provide an arrangement adapted to exhibit both flexibility and security as regards protection of users' private information items such as users' private keys and certificates, especially when these are not suitable to be stored in "ad hoc" devices.

More specifically, the invention aims at ensuring a high level of security also to mobile users and, in any case, to those users using terminals such as note books, portable computers, personal computers, PDAs, smartphones, and so on connected to a network and who need their cryptographic private keys in order to access security services.

According to an aspect of the present invention, such an object is achieved by means of a method for securely storing at least one user's private information item, characterised in that it includes the steps of:

allotting to said user a respective subscriber identity module, said subscriber identity module storing at least one security algorithm;

producing at least one cipher key via said at least one security algorithm; and providing a remote storing location accessible by said user via a communication network, wherein said user's private information item is stored as a file encrypted via said at least one cipher key.

According to another aspect of the present invention such an object is achieved by means of a system for securely storing at least one user's private information item, characterised in that it includes:

a subscriber identity module, said subscriber identity module storing at least one security algorithm;

a user terminal comprising a processing module, said processing module being able to be connected with said subscriber identity module for producing a cipher key via said at least one security algorithm.

According to further aspects of the present invention such an object is achieved by means of a related communication network and a computer program product loadable in the memory of at least one computer and comprising software code portions for performing the steps of the method of the invention when the product is run on a computer. As used herein, reference to such a computer program product is intended to be equivalent to reference to a computer readable medium containing instructions for controlling a computer system to coordinate the performance of the method of the invention. Reference to "at least one computer" is evidently intended to highlight the possibility for the system of the invention to be implemented in a distributed/modular fashion.

Further preferred aspects of the present invention are described in the dependent claims and in the following description.

Specifically, the arrangement described herein provides the required level of protection by exploiting a device having a high degree of diffusion within the context of mobile communications, namely a Subscriber Identity Module or SIM.

Specifically, in the arrangement described herein, the user's private information items (such as e.g. private keys and certificates) are stored in a remote server, protected via cryptographic algorithms by means of keys that can be generated only via the users' SIMs operating with a specific processing module installed on the users' terminals. In that way, users may request their private information items from any terminal having a network connection to the remote server in question. Such private information items are transmitted in encrypted form and can be used only if the user is in possession of the correct SIM, namely the SIM that has encrypted such private information items in a previous registration phase.

In that way, use of the information items is completely controlled by the SIM of the owner of the information items themselves. Accessing the encrypted private information items will not per se reveal any information concerning the users' private information items. Additionally, even the remote server storing the encrypted private information items will not be in a position to access the users' private information items in plaintext form, lacking availability of the users' SIMs. In that way, the remote server will not be subjected to any specific responsibility and will reduce any risk in terms of security even in case it is compromised.

The protection mechanism of the users' private information items is not based on password-base mechanisms, nor does it require "ad hoc" hardware. This makes it possible to neutralize all those attacks used to compromise the security of the system overall.

By means of the arrangement described herein, the user may thus access his or her private keys (or any other private information item) from any terminal having a network connection such as an Internet connection. Once decrypted by the SIM, such private keys may be used directly with a software installed in the terminal itself. Such software is usually already adapted to use such private keys in a native manner, as is the case of most Microsoft™ platforms (Internet Explorer, Outlook, Outlook Express, Explorer, Office, and so on; at least some of those designations being trademarks). Additionally, it is reasonable to believe that the number of applications adapted to exploit users' private keys and certificates in a native manner, without additional software, will increase in the future.

In order to provide a client with a higher degree of flexibility and mobility, the processing module running on the user terminal can be implemented via technologies such as Java Applet or ActiveX. In that way the processing module does not need to be pre-installed on the user terminal as it can be downloaded (and installed automatically) in run-time conditions from a web page, namely when the user requests access to his or her private keys. Using digital signature techniques, which are available in both Java and ActiveX environments, the user is enabled to check whether the downloaded software is legitimate and not maliciously developed by a hacker with the aim of revealing the user's private keys.

BRIEF DESCRIPTION OF THE ANNEXED DRAWINGS

Figure 5:
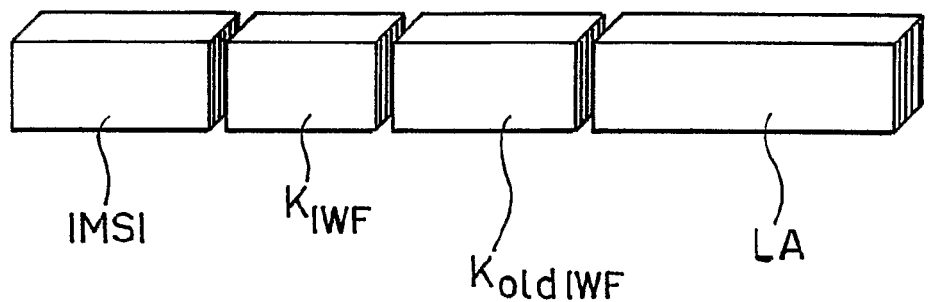
Figure 6:
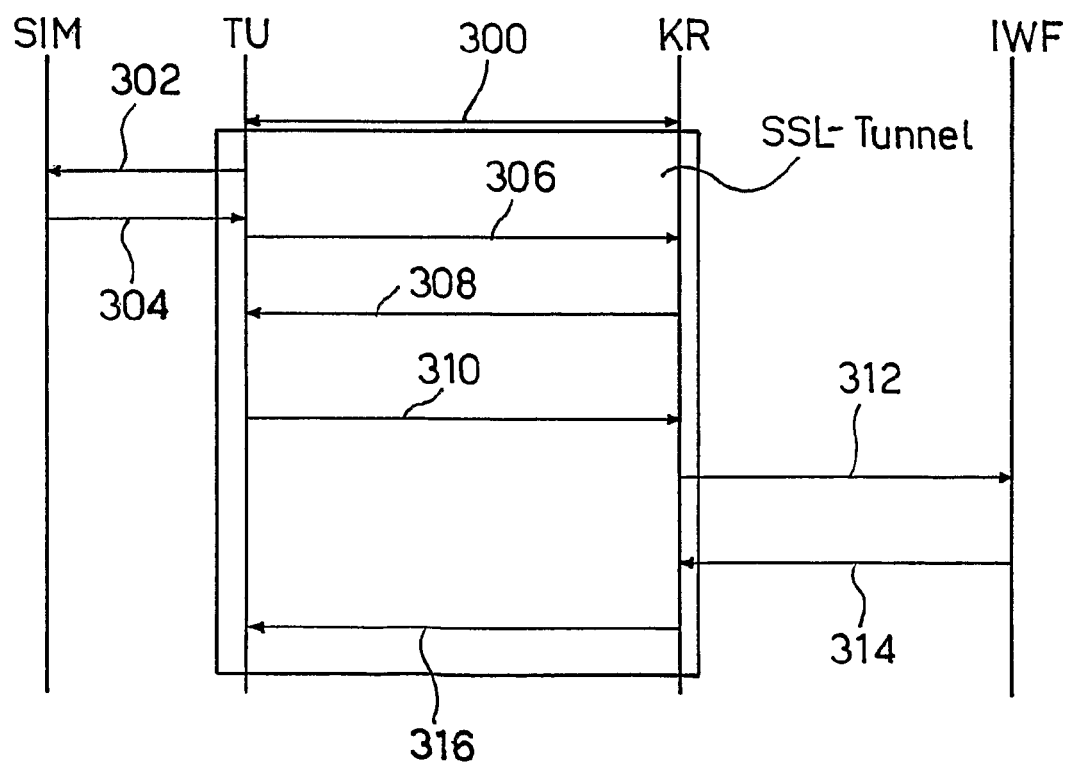

The invention will now be described, by way of example only, by referring to the enclosed figures of drawing, wherein:

FIG. 1 is a block diagram exemplary of the architecture of a system as described herein, FIGS. 2, 4, 6 and 7 are charts exemplary of possible operation of a system according to the arrangement described herein, and FIGS. 3 and 5 are functional block diagrams representative of data handling in the arrangement described herein.

DETAILED DESCRIPTION OF PREFERRED EMBODIMENTS OF THE INVENTION

The arrangement described herein permits mobile users or, in any case, users using terminals such as notebooks, portable computers, personal computers, PDAs, smartphones and the like to have certain private information items such as e.g. private keys and certificates available when connected to a network.

This occurs in security conditions, without having to resort to ad hoc security devices such as smart cards, USB tokens, PCI/PCMCIA cards and so on.

Protection of the private information items is via a security device currently available to user of mobiles networks namely user's Subscriber Identity Module or SIM.

Specifically, the arrangement described herein enables users of any public key infrastructure (PKI), namely an infrastructure whose services are based on a public-key cryptography arrangement, to have a higher degree of security in respect of passwords. This even if they are not in possession of a smart card or another token or hardware device specifically devoted to that purpose.

The arrangement described herein requires the users to be provided with a SIM and that such SIM may be connected to a user terminal. Such a user terminal may be a notebook, a portable computer, a personal computer, a PDA, a smartphone and so on.

At present, several ways exist for interfacing such devices with a SIM.

An exemplary list is referred to the block diagram of FIG. 1.

Specifically, in the arrangement shown in FIG. 1, the SIM can be interfaced with a user terminal TU by several methods, such as, but not limited to:

a standard PCSC reader 10;

a mobile phone through a Bluetooth channel 20 (used as a wireless SIM reader);

a mobile phone through an IrDA channel 30; or a mobile phone 40 through a cable connected to Serial/Parallel/USB/Firewire port (used as a wired SIM reader).

Technological evolution will expectedly provide new devices and protocols to interface a SIM to a computer system. The present invention does encompass the possible use of such new devices and protocols.

Via the respective SIM and resorting to the arrangement described herein, the user (hereinafter designated U) is in a position to:

authenticate himself or herself with a key repository (hereinafter KR) having stored therein, in an encrypted form, the respective private keys (or any other private information item);

request and download his or her own private keys in encrypted form;

decrypt such private keys via the SIM; and using locally such private keys and possibly delete them in a secure manner once use is completed.

Essentially, the arrangement described herein provides for the presence of the following elements:

SIM: as used herein, this designates a SIM card or a USIM card, typically used in mobile networks, such as GSM or UMTS networks respectively, to control and protect the user access to the network resources. Specifically, in order to gain access to a mobile network, a user must be authenticated. In a GSM/UMTS network this authentication is implemented as a classical challenge-response mechanism. The network sends a random value, called RAND, to the user mobile phone, which, in turn, forwards the value to the SIM. The SIM, which contains a unique secret key, called Ki, encrypts this RAND with a mobile operator dependent algorithm called A3, in order to produce an authentication response SRES. This authentication response SRES is returned to the network which, knowing the SIM key Ki, performs the same computation and checks its SRES against the one supplied by the user. If the two values match, the access is granted to the user, otherwise the access request is rejected. In the former case, the SIM will also encrypt the RAND value with another mobile operator dependent algorithm, called A8, and with the key Ki, to produce a session key, called Kc. This key will be passed to the mobile phone, in order to protect the radio link between the mobile phone and the mobile network transceiver station.

User (U): this is the owner of the SIM and the private keys (or, more generally, the private information items) to be protected. The user U may need to exploit such private keys with a plurality of terminals, such as notebooks, portable computers, personal computers, PDAs, smart phones and the like.

User terminal (TU): as used herein, this is the terminal connected to a network which enables the user U to contact a key repository KR having stored therein his or her private keys. Such a terminal is further connected (see FIG. 1) to the user's SIM. A non-limiting list of users' terminals TU adapted for use in the arrangement described herein includes a personal computer, a notebook, a laptop, a PDA, a smart phone. The terminal can be connected to the SIM via various technologies, for instance via a smart card reader, a Bluetooth mobile terminal, an IrDA mobile terminal, a mobile terminal through a cable.

Additionally, on board the user terminal TU a processing module is installed adapted to connect and exchange information with the key repository KR, on the one side and the user's SIM on the other side.

Key repository (KR): as indicated in the foregoing, this is a remote server that stores in an encrypted manner the users' private keys. Such a remote server is adapted to be reached by the terminals of the users U in order to permit access to the respective encrypted private keys.

Interworking Function (IWF): as used herein, this is a server (typically under the control of the mobile operator that released the SIM) adapted to verify that those SIMs requesting access to the private keys are active and valid (namely that they are not reported as stolen, lost, and so on). Such a server is in a position to interface with the respective network (for example a GSM or a UMTS network) and specifically with a so-called AuC (Authentication Centre) in order to perform the authentication function of the users U, or to be more precise, of the SIMs. Consequently, it plays the role of authentication gateway between an IP network and a GSM/UMTS network. As explained in detail in the following, the presence of an interworking function IWF is not imperative for the purposes of operation of the arrangement described herein. Those of skill in the art will however appreciate that the presence of an interworking function may increase the level of security of the system overall.

The present description refers, by way of example only, to a possible embodiment of the arrangement described herein based on a GSM network and a related SIM infrastructure. Those of skill in the art will promptly appreciate that the arrangement described herein may be adapted for operation within the framework of e. g. a UMTS network by exploiting the related USIM infrastructure. The same can apply to any other network framework supported by an encryption based subscriber identity infrastructure based on the challenge-response scheme, or otherwise essentially similar to the SIM infrastructure.

As used herein, the term "SIM" is therefore intended to encompass all these alternative infrastructures based on the same operating principles.

The elements designated TU, KR and IWF (if present) are connected via network technologies and protocols. Standard solutions or proprietary solutions can be used for that purpose. The description that follows will refer, by way of example only, to standard technologies and protocols as defined by IETF (Internet Engineering Task Force), the main international entity for the standardisation of protocols used over IP networks.

The steps provided for in the arrangement described herein for locating and decrypting the user's private keys can be implemented by means of the processing module present on the user terminal TU. As indicated, such a processing module does not need to be necessarily pre-installed on the terminal. It can easily be downloaded on-line from a web site to which the user U connects.

Various technologies such as Java and ActiveX can be used for that purpose. These technologies allow to include executable object code directly within a web page by means of TAGs. A browser adapted to support such technologies such as Internet Explorer, Netscape Navigator or Opera, is in a position, after detecting the presence of Java or ActiveX applet, to download locally the corresponding code and provide for execution thereof.

Both technologies permit to define security policies when downloading the executable code. Specifically, the possibility exists of configuring the browser in such a way that only Java and ActiveX applets bearing a digital signature are downloaded. This is primarily in order to reduce the risk of downloading so-called "maleware", namely software written with the only purpose of revealing the users' data or accessing in an unauthorised way to the users' terminals TU.

Other solutions may be adopted for the same purpose, such as downloading an executable code via network protocols such as FTP, TFTP, HTTP. Alternatively, the code required may be pre-installed via other means such as a CD, floppy disk, USB token and the like. Of course, on-line downloading may be preferable in terms of ensuring a wider device coverage.

In the following, two basic procedures will be considered, namely:
  user registration procedure, and
  access by the user to private keys.

The user registration procedure aims at creating, with the key repository KR, an association of those files containing the private keys, encrypted via the SIMs, with the SIMs themselves.

Such procedure is carried out initially for registering the user U and subsequently whenever the user U wishes to modify his or her private keys or the secret keys, generated by the SIM, that in turn protect the private keys (or, more generally, the users' private information items).

The user registration procedure may be carried out at a local environment, in a controlled and protected situation, or remotely, on a dedicated or public network. In this latter case, integrity, authentication and confidentiality of communication are preserved together with protection from replay attacks. This can be implemented on the basis of various solutions known in the art such as e.g. IPsec, SSL/TLS, SSH, and so on.

As shown in FIG. 2, the user registration procedure involves the steps detailed in the foregoing.

In a first step 100, the user U interfaces his or her terminal TU with a user's SIM. To that end, various different solutions may be used, as shown in FIG. 1.

Specifically, the user U activates on his or her terminal TU a processing module adapted to encrypt those files corresponding to the private keys via the SIM based on the mechanism described herein. The processing module checks if a SIM is connected to the user terminal TU by means of one of the channels 10 to 40 shown in FIG. 1.

Once a SIM is detected, the processing module checks the possible presence of a PIN protecting an access. In that case, the user U is requested to enter a corresponding PIN, which occurs via e.g. a graphic user interface (GUI).

Subsequently, in a step 102, the processing module accesses the SIM (possibly via the PIN provided by the user U) and in a step 104 produces two random values RAND1 and RAND2, in particular two 128 bit random values. These random values RAND1 and RAND2 are forwarded to the SIM.

In a step 106, the SIM computes two session keys Kc1 and Kc2, each including 64 bits, based on the secret key Ki of the SIM and the A8 GSM security algorithm. The A8 GSM security algorithm represent the basic security algorithm stored in the SIM. Specific details in that respect can be derived from the GSM Technical Specification GSM 03.20 (ETSI TS 100 929 v8.1.0): "Digital cellular telecommunication system (Phase 2+); Security Related network functions", European Telecommunications Standards Institute, July 2001; or from the GSM Technical Specification GSM 11.11 (ETSI TS 100 977 v8.3.0): Digital cellular telecommunication system (Phase 2+); Specification of the Subscriber Identity Module—Module Equipment (SIM—ME) interface", European Telecommunication Standards Institute, August 2000.

Such computation is based on the two random values RAND1 and RAND2 provided by the processing module. In brief: Kc1=A8 (RAND1), Kc2=A8(RAND2). These two session keys Kc1 and Kc2 are sent back to the processing module that, in a further step 108, computes an encryption key K, including 128 bits, by applying a hash function h to the concatenation of the two session keys Kc1 and Kc2. In brief: K=h(Kc1, Kc2). General information concerning this kind of processing can be located in A. J. Menezes, P. C. van Oorschot. S. A. Vanstone, "Handbook of Applied Cryptograpy", CRC Press, ISBN: 0-8493-8523-7, October 1996.

Different functions may be used for that purpose such as (by referring to a non-limiting list) a SHA-1 function or a MD5 function.

It is also possible to compute the encryption key K in a different manner, possibly using also the authentication responses SRES obtained via the authentication challenges (random values) RAND1 and RAND2. In general, the encryption key K can be computed as a function of the two session keys Kc1 and Kc2 and the authentication responses SRES1, SRES2 obtained via the authentication challenges RAND1 and RAND2: K=f(Kc1, Kc2, SRES1, SRES2). In that way, it is possible to change the encryption key length by operating on the number of inputs processed. For instance, it is possible to increase the number of inputs to be processed by sending a sequence of authentication challenges RAND1, RAND2, . . . , RANDn and processing the corresponding outputs of the SIM Kc1, Kc2, . . . , Kcn, SRES1, SRES2, . . . , SRESn. In that case, therefore, K=f(Kc1, Kc2, . . . , Kcn, SRES1, SRES2, . . . , SRESn)

Additionally, the user U can add a personalised secret key $K_U$ in order to change the encryption key K so that it is no longer exclusively depending on the GSM security function. In that way, not even the mobile network operator, who is aware of all the data concerning the users' SIMs, may perform a key recovery function of the private keys of a user U without the positive cooperation of the user U. In this latter case, the function for generating the encryption key K will be expressed by the formula: K=f($K_U$, Kc1, Kc2, . . . , Kcn, SRES1, SRES2, . . . , SRESn), where $K_U$ is the personalised secret key selected by the user U.

Subsequently, the processing module can also generate, in a step 110, a random vector, defined Initialisation Vector IV, including, for example, 128 bits. Such a random vector is exploited in cipher processing (encrypting/decrypting) when a cipher mode requesting an Initialisation Vector is used such as CBC (Cipher Block Chain), CFB (Cipher FeedBack), OFB (Output FeedBack). The Initialisation Vector IV can also be omitted depending on the mode of operation of the encrypting entity; for instance, the Initialisation Vector IV is not required in the case of ECB (Electronic Code Book). Details on the various cipher processing methods referred to in the foregoing are provided e.g. in the Menezes et al. reference already mentioned in the foregoing.

In a step 112, the processing module encrypts the files corresponding to the user private keys (or the private information items) via the encryption key K and the random vector IV, for instance by using the AES cipher in the CBC mode. However, any other symmetric encryption methods can be used such as e. g. RC6, Twofish, Serpent, 3DES, this being a non-limiting list. Optionally, the processing module may effects a compression of the files including the private keys before applying the encryption functions. Various non-lossy algorithm may be used for that purpose such as: PKZIP, GZIP, RAR, ACE, ARJ, LZH, this being a non-limiting list. The generated encrypted data are indicated with the reference ED in FIG. 3.

The processing module also inserts in the encrypted file a crypto header CH to permit decryption.

As shown in FIG. 3, such a crypto header CH includes the following fields:

RAND1, RAND2, i.e. the two random values (authentication challenges) sent to the SIM for constructing the encryption key K;

IV, i.e. the random vector possibly used for the encryption (CBC or other encryption mode requiring such a parameter) and generated by the processing module;

Version: this is an auxiliary string that codifies the processing module version, the encryption algorithm used (AES, RC6, 3DES, on so on), the encryption mode used (CBC, ECB, OFB, and so on), the hash function used (SHA-1, MD5, RIPEMD, Tiger, and so on) the compression algorithm possibly used (PKZIP, RAR, ARJ) and other useful information; and $MAC_K$ (RAND1, RAND2, IV, Version, Encrypted File) this is a cryptographic control checksum on the encrypted file and the three previous fields. Such cryptographic control checksum may be generated by means of a MAC (Message Authentication Code) function. Exemplary of such MAC functions are e.g. HMAC-SHA-1, HMAC-MD5, AES-XCBC-MAC. In the following the assumption will be made that the function HMAC-SHA-1 is used. In any case, such cryptographic control checksum also detects any possible unauthorised modifications to the encrypted file.

Reverting to the flow chart of FIG. 2, in a step 114, the encrypted file, together with a SIM identifier, is passed on the key repository KR wherein the encrypted file is stored within a database. Various elements may be resorted to in order to act as the SIM identifier. Exemplary of these are the IMSI, (International Mobile Station Identity—now International Mobile Subscriber Identity), the MSISDN (Mobile Subscriber ISDN Number), the SIM serial number and so on. In the following it will be assumed that the IMSI identifier is used. Finally, the key repository KR may send the SIM identifier to the interworking function IWF (if present) in order to insert the user's SIM in the list of those SIMs that are enabled to render such service.

The procedure permitting access by the user U to the encrypted file is intended to permit access and local downloading of the private keys (or any other private information item) by the user U in a secure way under the control of the SIM. Such access may take place from any user terminal TU provided with the processing module considered in the foregoing and connected with the key repository KR, the SIM and, possibly, the interworking function IWF.

Specifically, a preferred embodiment of the arrangement described herein provides, as illustrated in FIG. 4, for a first interaction between the user U and the interworking function IWF. Such interaction aims at authenticating the user U via the SIM and creating an access key $K_{IWF}$ in cooperation with the user U and the interworking function IWF to be subsequently used in communicating with the key repository KR. The steps illustrated in FIG. 4 may be effected also on a shared network.

In the following, it will be assumed that the user U has properly interfaced his or her own terminal TU with the SIM. This may occurs by resorting to the various technical solutions illustrated in FIG. 1.

In a step 200, the user U activates on his or her terminal the processing module that connect to the interworking function IWF via a protocol such as SSL/TLS or the like. Using a protocol such as SSL/TLS enables the user U to authenticate the interworking function IWF via conventional techniques (such as digital certificates) currently available with web browsers (such as Internet Explorer, Netscape Navigator, Opera) in various platforms such as Windows 9X/Me/NT/2000/XP/PocketPC/CE, Linux, Sun Solaris, and the like.

It is also possible to use any other equivalent protocol adapted to provide authentication of the server (namely, of the interworking function IWF), communication confidentiality, communication integrity and protection from replay attacks.

At this point, in two steps designated 202 and 204, respectively, the user terminal TU requests and obtains an identifier from the SIM. This SIM identifier, represented e.g. by the IMSI, is sent to the interworking function IWF in a step 206.

The interworking function IWF performs two typical GSM authentication steps by sending towards the user U two authentication challenges RAND1 and RAND2, comprised of randomly generated numbers, and controlling the corresponding authentication responses SRES1 and SRES2. This occurs in subsequent steps. In steps 208 and 210 the two authentication challenges are sent from the interworking function IWF to the SIM via the user terminal TU. In two further steps 212 and 214 the authentication responses SRES1 and SRES2 are sent back from the SIM to the interworking function IWF via the user terminal TU.

The GSM authentication being successful is communicated by the interworking function IWF to the user terminal TU, in a step 216, (of course this steps may also convey the information of aborted GSM authentication, in which case the procedure is halted).

If the procedure is continued, the interworking function IWF and the user U locally generate the access key $K_{IWF}$, computed as $K_{IWF}=h(Kc1, Kc2)$. The respective steps are essentially similar to those described in the foregoing in connection with the steps 104 to 108 of FIG. 2.

The interworking function IWF memorises in the IWF database the access key $K_{IWF}$.

Additionally, the interworking function IWF memorises in the IWF database the association of the access key $K_{IWF}$ and the SIM identifier, namely the IMSI, together with other log information such as, e.g. the last access data LA, the previous access key $K_{old-IWF}$ and so on. The corresponding data structure is represented in FIG. 5, which is exemplary a typical record adapted to be memorised in the IWF database.

Also in this case the possibility exists of generating the access key $K_{IWF}$ based on different strategies. For instance, the access key $K_{IWF}$ can be computed as $K_{IWF}=f(K_{U-IWF}, Kc1, Kc2, \ldots, Kcn, SRES1, SRES2, \ldots, SRESn)$ where $K_{U-IWF}$ is the personalized secret key $K_U$ shared in the user registration procedure between the user U and the interworking function IWF, while SRES1, ..., SRESn, Kc1, Kcn are n authentication responses and n session keys obtained via the A3 and A8 GSM security algorithms as a function of n authentication challenges RAND1, ..., RANDn. It is also possible to use other authentication strategies based or not on the SIM.

The processing module in the user terminal TU subsequently connects to the key repository KR via the SSL/TLS protocol or the like. This essentially involves a handshake step designated 300 in FIG. 6.

Using a protocol such as SSL/TLS enables the user U to authenticate the key repository KR by means of conventional techniques (Digital Certificates), currently available in web browsers (such as Internet Explorer, Netscape Navigator, Opera) of various platforms (Windows 9X/Me/NT/2000/XP/PocketPc/CE, Linux, Sun Solaris and so on). It is also possible to use for that purpose any other functionally equivalent protocol adapted to provide a server authentication (namely authentication of the key repository KR), communication confidentiality, communication integrity and protection against replay attacks.

Subsequently, the processing module performs an access request towards the user private keys by means of a request message. To that purpose, the user terminal TU requests and obtains from the SIM the respective SIM identifier (IMSI), in two steps designated 302 and 304 in FIG. 6. This SIM identifier is subsequently sent in a step 306 towards the key repository KR together with other parameters such as:

an identifier, designated ID, of the private key requested; such parameter may identify one or more private keys associated with the same user;

a timestamp of the request (if available); such parameter, designated T, identifies the time in a format agreed upon by the parties, such as UTC;

a Nonce $N_u$, namely a parameter adapted to neutralise possible replay attacks; this is generally comprised of random values, sequence numbers or time parameters.

The key repository KR checks whether the SIM specified is registered, and, in the positive, the consistency of the parameter T.

If the checks yield a positive result, the key repository KR generates a respective Nonce $N_{KR}$ and in a step 308 sends back towards the user terminal TU a message comprised of the following information: IMSI, ID, T, $N_U$, $N_{KR}$.

At this point the processing module checks, within the message received, the presence and correctness of the various parameters and then calculates a cryptographic control checksum $MAC_{KIWF}$ for the message received based on the access key $K_{IFW}$. In brief: $MAC_{KIWF}$ (IMSI, ID, T, $N_U$, $N_{KR}$). Such a cryptographic control checksum is then returned to the key repository KR (step 310).

In a subsequent step 312, the key repository KR sends to the interworking function IWF, over a secure channel, the following message: IMSI, ID, T, $N_U$, $N_{KR}$, $MAC_{KIWF}$ (IMSI, ID, T, $N_U$, $N_{KR}$).

Protection of communication between the key repository KR and the interworking function IWF may be via different solutions. A non-limiting list is: TLS/SSL, IPsec, SSH, dedicated link.

The interworking function IWF checks the cryptographic control checksum $MAC_{KIWF}$ for correctness by accessing the IFW database by using a primary search key corresponding to the IMSI provided by the SIM.

If the check yields a positive outcome, the interworking function IWF extracts from the record memorised in the IWF database the access key $K_{IWF}$ and computes the cryptographic control cheksum $MAC_{KIWF}$ based on the data received in order to check the correctness thereof with respect to those provided by the key repository KR.

In a step 314 the result of comparison is returned to the key repository KR while the operation is stored in a corresponding log file.

Of course, failure of any of the checks mentioned in the foregoing leads to the procedure being aborted with a corresponding alert being sent to the user U.

In the case the authentication is successful, the key repository KR accesses its database with a primary search key corresponding to the IMSI provided by the SIM in order to retrieve the private key(s) $K_{ID}$ requested by the user U and present in the database within the encrypted file. The private key(s) $K_{ID}$ are then sent back to the user U.

The user U receives the encrypted file and decrypts it by letting the SIM reconstruct the value of the encryption key K based on the information contained in the crypto header CH.

Figure 7:
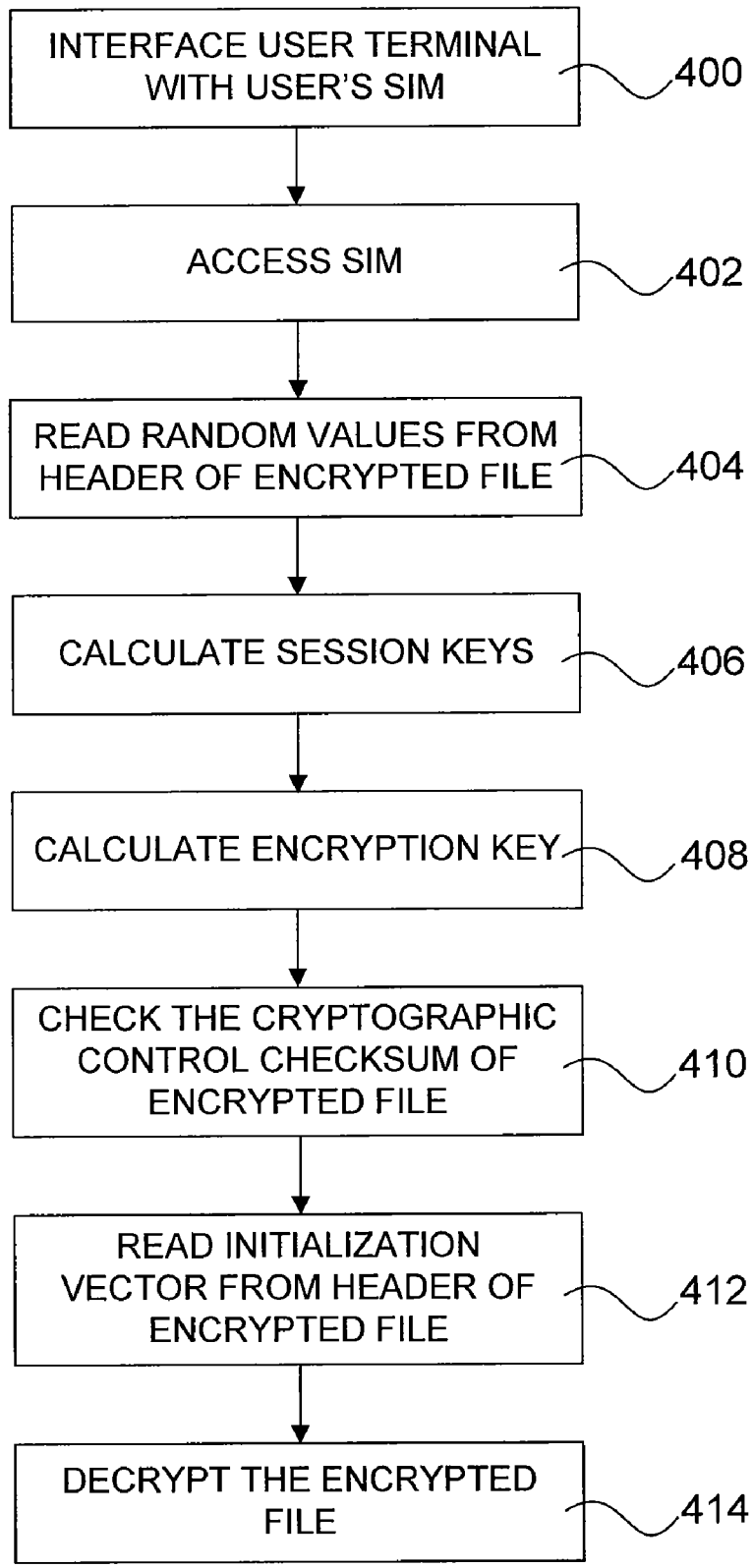

Specifically, in the flowchart of FIG. 7, the steps 400 and 402 are representative of access steps essentially identical to the steps designated 100 and 102 in FIG. 2.

In a step 404, the processing module located on the user terminal TU reads the contents of the fields RAND1 and RAND2 in the crypto header CH representative of the two random values RAND1 and RAND2, respectively. The random values RAND1 and RAND2 are passed on to the SIM.

In a step 406 the SIM performs the calculation of the two session keys Kc1=A8 (RAND1) and Kc2=A8 (RAND2). The two session keys Kc1 and Kc2 are then returned to the processing module.

In a step 408, the processing module re-constructs the encryption key K by calculating the hash function h applied to the concatenation of the two session keys Kc1 and Kc2. In brief: K=h(Kc1, Kc2). It is also possible to use the alternative construction techniques for the encryption key K considered in the foregoing, whereby the encryption key K can be generally expressed as K=f ($K_U$, Kc1, Kc2, . . . , Kcn, SRES1, SRES2, . . . , SRESn).

In a step 410 the processing module accesses the encrypted file and re-computes the cryptographic control checksum $MAC_K$ on the bases of the encryption key K just (re)-constructed, the contents of the encrypted file and the fields RAND1, RAND2, IV and Version contained in the crypto header CH. Such a value is then compared with the value for the cryptographic control cheksum $MAC_K$ present in the crypto header CH.

In the case of a positive outcome, the processing module reads from the crypto header CH the field IV (step 412) and in step 414 decrypts the encrypted file via e.g. the AES algorithm in a CBC mode with the random vector IV selected and the encryption key K reconstructed by the SIM.

The private key(s) $K_{ID}$ of the user U is now in plaintext form and can be used within any compatible software module present in the user terminal TU.

As indicated in the foregoing, the arrangement described herein may operate also without the provision of the interworking function IWF. In that case, the user registration procedure is modified in order to define an authentication method for the key repository KR and the user U.

The procedure for accessing the encrypted file containing the private keys is terminated directly on the key repository KR.

Specifically, the key repository KR will authenticate the user U in a traditional manner, for instance, by resorting to a username/password arrangement shared during the user registration procedure. At that point, depending on the outcome of the authentication phase during the request, the key repository KR will decide whether the encrypted file containing the private key is to be sent to the user U.

In this case, the security level of the authentication process is lower. However, the general level of security is essentially maintained since the encrypted file, once sent and received by the user U, can be decrypted only via the SIM that has protected it.

Of course, the key repository KR may authenticate the user U by resorting to other mechanisms such as: one-time password, biometric systems, SIM-based authentication, this list being a non-limiting one.

The key repository KR may also be configured to connect with the interworking function IWF with the sole purpose of checking the status of the SIM corresponding to the IMSI received. In other words, the key repository KR may simply request from the interworking function IWF an indication as to whether the SIM associated with the IMSI received is still valid and active, or was revoked by the mobile operator or the user U (for instance due to loss, theft, failure and so on).

The arrangement described herein permits private key recovery by the user U even when the respective SIM is unavailable. In this latter case, it will be possible to start a procedure enabling the user U, once the crypto header of the encrypted file containing the private key(s)/information items is known, to re-construct the encryption key K.

This may occur, for instance, by communicating in a secure way to the operator of the mobile network the crypto header associated to the encrypted file or simply the two authentication challenges (random values) RAND1 and RAND2, while obtaining the corresponding authentication response SRES1 and SRES2 and the two session keys Kc1, Kc2.

Starting from those parameters, together with the random vector IV, the string Version and the possibly personalized secret key $K_U$, the user U will be in a position to re-construct the encryption key K and thus decrypt his or her private keys that can be protected by means of a new SIM.

Those of skill in the art will promptly appreciate that the arrangement described herein may be adopted in order to protect any information held to be confidential by the user U. In fact, the arrangement described herein does not permit the key repository KR to access the plaintext contents of the user files. This renders the system further secure and adapted for protecting any sort of file or digital information.

As indicated, the arrangement described herein is adapted for operating also in connection with other type of SIM-type card such as UMTS SIMs, currently referred to as USIMs. USIMs contain security functions that are analogous to the security functions of GSM systems: based on one or more authentication challenges RAND that enable the generation of cryptographic keys to be used as described in the foregoing.

Additionally, in the case of UMTS, a single authentication challenges RAND is adapted to generate several keys (CK, IK, and so on) thus making it possible to use a single random challenges RAND for constructing cryptographic keys to use for the protection of users' private keys.

Additionally, it will be appreciated that, as used herein, "cipher processing" conversion between a private information item and a corresponding file encrypted via at least one cipher key is intended to apply either to encrypting the private information item, to generate a corresponding encrypted file, or to recovering the private information item by decrypting the corresponding encrypted file, or even to the combination of the above encrypting and decrypting.

Therefore, without prejudice to the underlying principle of the invention, the details and the embodiments may vary, also significantly, with respect to what has been described by way of example, without departing from the scope of the invention as defined in the claims that follow.

The invention claimed is:

1. A method for securely storing at least one user's private information item, the method comprising the steps of:
   allotting to said user a respective subscriber identity module, said subscriber identity module storing at least one security algorithm;
   producing at least one cipher key via said at least one security algorithm by:
   generating one or more random values,
   receiving from the subscriber identity module one or more session keys determined based on at least the one or more generated random values, and
   producing the at least one cipher key based on at least the one or more session keys;
   storing the user's private information item in a file encrypted via said at least one cipher key;
   inserting into the file a cryptographic header comprising the one or more random values and a cryptographic control checksum for detecting unauthorized modifications to the file;
   storing the encrypted file at a remote storing location accessible by the user via a communication network;
   receiving a user's request for said user's private information item via said communication network;
   authenticating said requesting user with said remote storing location by at least one interworking function comprising:
   interfacing said subscriber identity module with said interworking function,
   checking if said subscriber identity module is included in a list of subscriber identity modules enabled within the framework of said communication network, and
   if said subscriber identity module is enabled, causing said interworking function to generate at least one access key, said at least one access key being used to access said at least one private item stored as an encrypted file in said remote storing location;
   sending via said communication network said requested user's private information item to said requesting user as said encrypted file; and
   enabling decryption of said encrypted file at said requesting user by means of said at least one cipher key to retrieve said requested user's private information item.

2. The method according to claim 1, wherein the at least one security algorithm further performs steps of:
   subjecting the one or more random values to said at least one security algorithm to generate at least two session keys; and
   mixing said at least two session keys via a mixer function to produce said at least one cipher key.

3. The method according to claim 2, wherein said mixer function is a hash function.

4. The method according to claim 3, comprising the step of including in said mixer function a user specific secret, whereby said at least one cipher key is unpredictable even on the basis of knowledge of any keys stored in said subscriber identity module.

5. The method according to claim 1, wherein the cryptographic header further comprises at least one of a random vector and a version string associated with the at least one security algorithm.

6. The method according to claim 1, comprising the step of accepting said user's request subservient to said requesting user's authentication with said remote storing location.

7. The method according to claim 6, wherein the step of accepting said user's request subservient to said requesting user's authentication with said remote storing location comprises the step of authenticating said requesting user with said remote storing location by at least one of the following identity items: user name, password, one-time password, biometric systems, or SIM-based authentication.

8. The method according to claim 1, wherein said step of causing said interworking function to generate at least one access key comprises the steps of:
   generating at least one random number;
   sending said at least one random number in the form of an authentication challenge;
   monitoring at least one response to said authentication challenge;
   determining successful authentication of said user based on said at least one response; and
   generating at least said access key based on at least one entity selected from a group consisting of said at least one random number and said at least one response.

9. A system for securely storing at least one user's private information item, the system comprising:
   a subscriber identity module, said subscriber identity module storing at least one security algorithm;
   a user terminal comprising a processing module, said processing module being able to be connected with said subscriber identity module for producing a cipher key via said at least one security algorithm by:
   generating one or more random values,
   receiving from the subscriber identity module one or more session keys determined based on at least the one or more generated random values, and
   producing the cipher key based on at least the one or more session keys;
   encrypting a file via the cipher key, wherein the file stores the user's private information item; and
   inserting into the file a cryptographic header comprising the one or more random values and a cryptographic control checksum for detecting unauthorized modifications to the encrypted file;
   a remote storing location accessible by said user via a communication network, said remote storing location configured for storing the file; and
   an interworkinq server for authenticating said user with said remote storing location when said user requests said file by:
   interfacing said subscriber identity module with said interworking server,
   checking if said subscriber identity module is included in a list of subscriber identity modules enabled within the framework of said communication network, and
   if said subscriber identity module is enabled, causing said interworking server to generate at least one access key, said at least one access key being used to access said private information item stored as an encrypted file in said remote storing location.

10. The system according to claim 9, wherein said user terminal comprises a personal computer or a notebook or a laptop or a PDA, or a smart phone.

11. The system according to claim 9, wherein said user terminal is connected to said subscriber identity module via at least one of a smart card reader, a Bluetooth mobile terminal, an IrDA mobile terminal, and a mobile terminal connected to a cable.

12. A communication network comprising a system for securely storing at least one user's private information item, the system comprising:

a subscriber identity module, said subscriber identity module storing at least one security algorithm;

a user terminal comprising a processing module, said processing module being able to be connected with said subscriber identity module for producing a cipher key via said at least one security algorithm by:
  generating one or more random values,
  receiving from the subscriber identity module one or more session keys determined based on at least the one or more generated random values, and
  producing the cipher key based on at least the one or more session keys;
  encrypting a file via the cipher key, wherein the file stores the user's private information item; and
  inserting into the file a cryptographic header comprising the one or more random values and a cryptographic control checksum for detecting unauthorized modifications to the encrypted file;

a remote storing location accessible by said user via the communication network, said remote storing location configured for storing the file; and an interworking server for authenticating said user with said remote storing location when said user requests said file by:
  interfacing said subscriber identity module with said interworking server,
  checking if said subscriber identity module is included in a list of subscriber identity modules enabled within the framework of said communication network, and
  if said subscriber identity module is enabled, causing said interworking server to generate at least one access key, said at least one access key being used to access said user's private information item stored as an encrypted file in said remote storing location.

13. A non-transitory computer readable medium storing instructions for execution on at least one computer, the instructions including software code portions capable of performing a method for securely storing at least one user's private information item, the method comprising:
  producing at least one cipher key via at least one security algorithm by:
    generating one or more random values,
    receiving one or more session keys determined based on at least the one or more generated random values, and
    producing the at least one cipher key based on at least the one or more session keys;
  inserting into the file a cryptographic header comprising the one or more random values and a cryptographic control checksum for detecting unauthorized modifications to the file;
  storing the user's private information item in a file encrypted using the at least one cipher key;
  receiving a user's request for said user's private information item via said communication network;
  authenticating said requesting user with said remote storing location by at least one interworking function comprising:
    interfacing said subscriber identity module with said interworkinq function,
    checking if said subscriber identity module is included in a list of subscriber identity modules enabled within the framework of said communication network, and
    if said subscriber identity module is enabled, causing said interworking function to generate at least one access key, said at least one access key being used to access said at least one private item stored as an encrypted file in said remote storing location;
  sending via said communication network said requested user's private information item to said requesting user as said encrypted file; and
  enabling decryption of said encrypted file at said requesting user by means of said at least one cipher key to retrieve said requested user's private information item.

14. A method for securely storing at least one user's private information item, the method comprising:
  producing at least one cipher key via at least one security algorithm:
    generating one or more random values,
    receiving from the subscriber identity module one or more session keys determined based on at least the one or more generated random values, and
    producing the at least one cipher key based on at least the one or more session keys; and
  storing the user's private information item in a file encrypted using the at least one cipher key;
  inserting into the file a cryptographic header comprising the one or more random values and a cryptographic control checksum for detecting unauthorized modifications to the file;
  receiving a user's request for said user's private information item via said communication network;
  authenticating said requesting user with said remote storing location by at least one interworking function comprising:
    interfacing said subscriber identity module with said interworking function,
    checking if said subscriber identity module is included in a list of subscriber identity modules enabled within the framework of said communication network, and
    if said subscriber identity module is enabled, causing said interworking function to generate at least one access key, said at least one access key being used to access said at least one private item stored as an encrypted file in said remote storing location;
  sending via said communication network said requested user's private information item to said requesting user as said encrypted file; and
  enabling decryption of said encrypted file at said requesting user by means of said at least one cipher key to retrieve said requested user's private information item.

* * * * *